Figure 1:
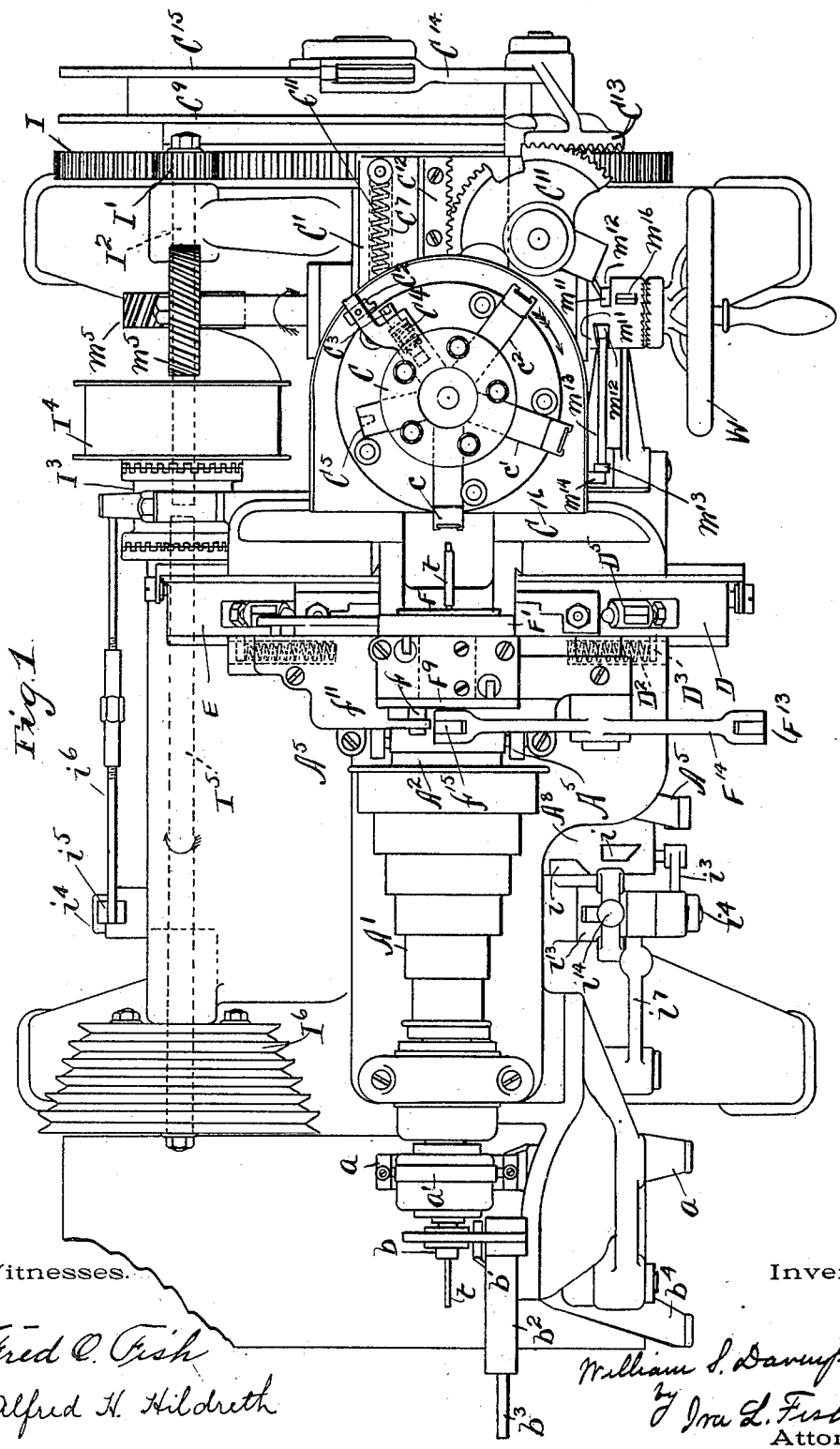

No. 681,845. Patented Sept. 3, 1901.
W. S. DAVENPORT.
METAL WORKING MACHINE.
(Application filed Jan. 2, 1901.)

(No Model.) 7 Sheets—Sheet 1.

Witnesses. Inventor.
Fred C. Fish William S. Davenport
Alfred H. Hildreth by Ira L. Fish
Attorney.

No. 681,845. Patented Sept. 3, 1901.
W. S. DAVENPORT.
METAL WORKING MACHINE.
(Application filed Jan. 2, 1901.)
(No Model.) 7 Sheets—Sheet 2.

Witnesses.
Fred O. Fish
Alfred H. Hildreth

Inventor.
William S. Davenport
by Ira L. Fish
Attorney.

No. 681,845. Patented Sept. 3, 1901.
W. S. DAVENPORT.
METAL WORKING MACHINE.
(Application filed Jan. 2, 1901.)

(No Model.) 7 Sheets—Sheet 3.

Witnesses.
Fred O. Fish
Alfred H. Hildreth

Inventor.
William S. Davenport
by
Ira L. Fish
Attorney.

THE NORRIS PETERS CO., PHOTO-LITHO., WASHINGTON, D. C.

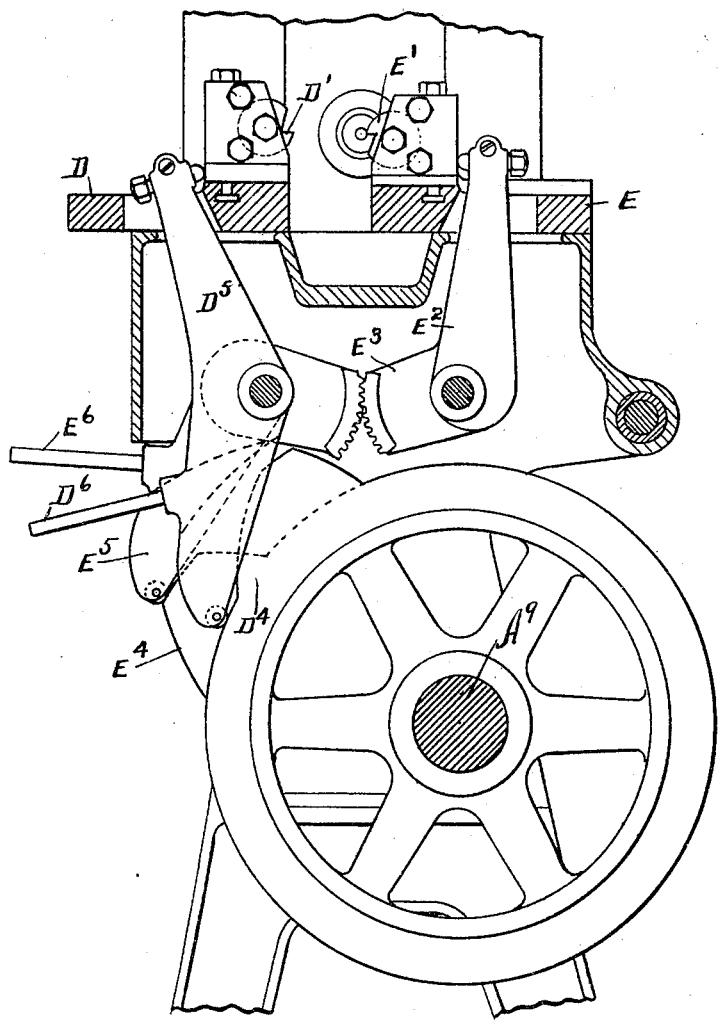

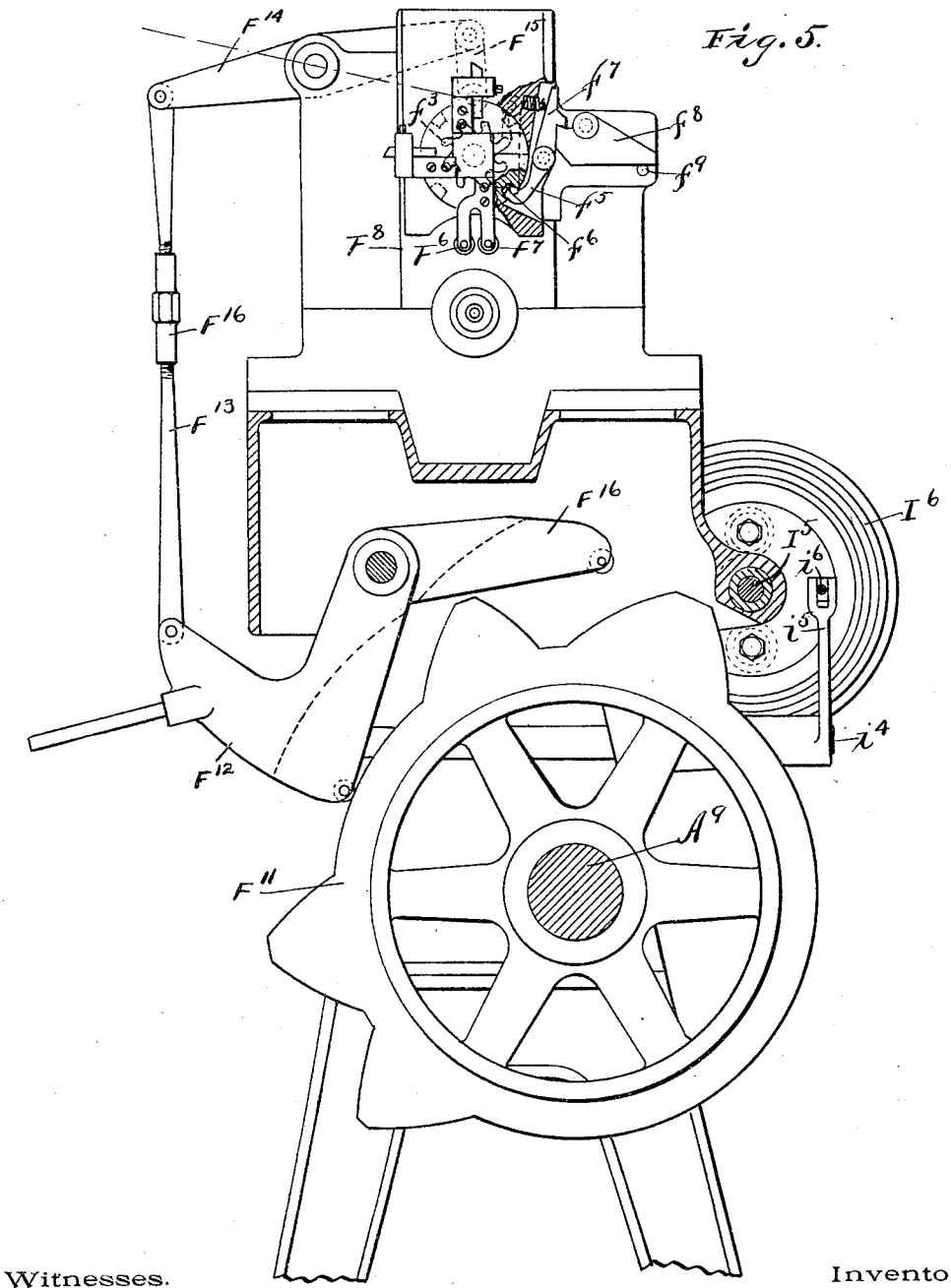

No. 681,845. Patented Sept. 3, 1901.
W. S. DAVENPORT.
METAL WORKING MACHINE.
(Application filed Jan. 2, 1901.)
(No Model.) 7 Sheets—Sheet 6.
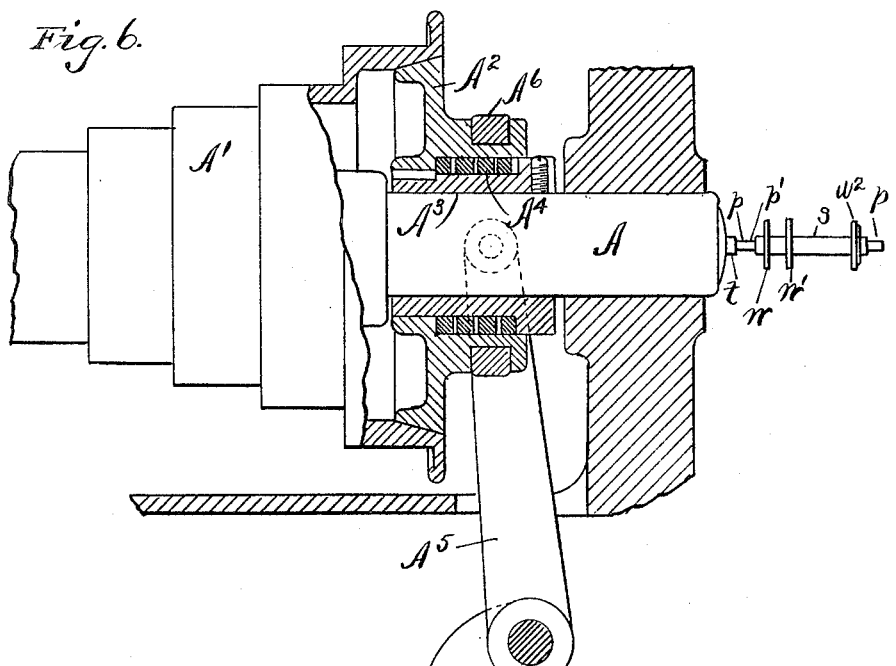
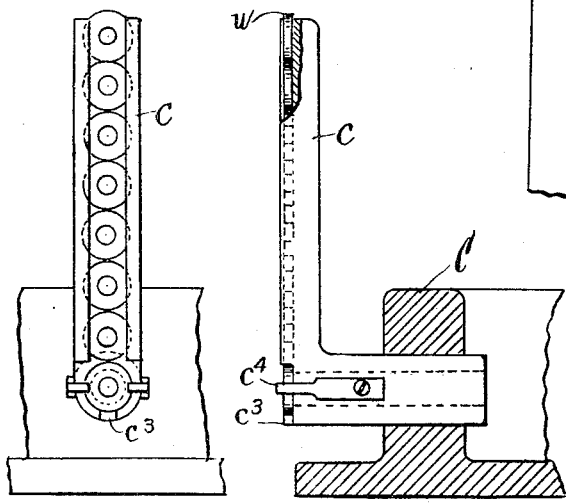
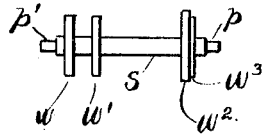
Witnesses. Inventor.
Fred O. Fish William S. Davenport
Alfred N. Hildreth by
Ira L. Fish
Attorney.

No. 681,845. Patented Sept. 3, 1901.
W. S. DAVENPORT.
METAL WORKING MACHINE.
(Application filed Jan. 2, 1901.)
(No Model.) 7 Sheets—Sheet 7.
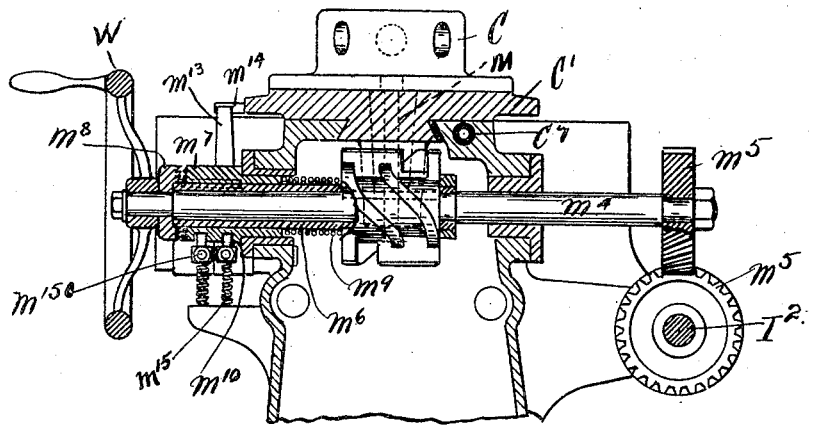
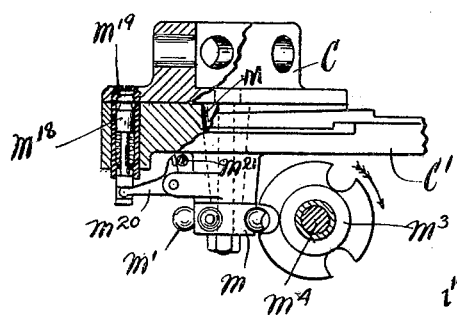
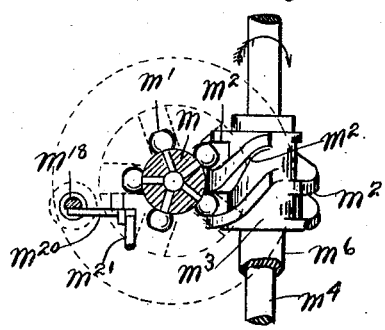
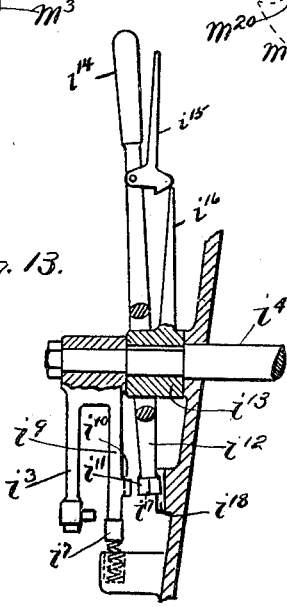
Witnesses.
Fred O. Fish
Alfred N. Hildreth
Inventor.
William S. Davenport
by
Ira L. Fish
Attorney.
THE NORRIS PETERS CO., PHOTO-LITHO., WASHINGTON, D. C.

UNITED STATES PATENT OFFICE.

WILLIAM S. DAVENPORT, OF NEW BEDFORD, MASSACHUSETTS.

METAL-WORKING MACHINE.

SPECIFICATION forming part of Letters Patent No. 681,845, dated September 3, 1901.

Application filed January 2, 1901. Serial No. 41,796. (No model.)

*To all whom it may concern:*

Be it known that I, WILLIAM S. DAVENPORT, of New Bedford, in the county of Bristol and State of Massachusetts, have invented a certain new and useful Metal-Working Machine, of which the following is a specification.

The purpose of the invention is to provide mechanism for automatically assembling and turning articles or pieces of work which consist of a central shaft or rod and one or more disks or blanks carried by said rod. Articles or pieces of this nature are extensively used in the manufacture of clocks and other mechanisms wherein small gears and pinions are employed, and heretofore the assembling of the parts of such article or piece and the turning and finishing of the same preparatory to securing the gears to the blanks or centers or forming the teeth of the gears or pinions when the disks are used as supports for the wires of lantern-gears involved the use of several machines and of successive handlings of the article and also care and skill on the part of the operator in turning and completing the article. With the present invention the operations involved in assembling the parts of the article and in turning and finishing the same are performed by mechanisms operatively connected and combined to automatically assemble the parts of the article and turn them to the desired form and size.

The specific construction and arrangement of the mechanisms for effecting or performing the operations hereinafter referred to is not material to the invention, as any suitable mechanisms may be employed which are so organized and arranged that they will act to automatically perform the operations referred to. Neither is it essential that a machine embodying the invention shall contain mechanisms for effecting or performing all the operations hereinafter referred to, as in some cases it may be found desirable to combine mechanisms for performing a part only of the operations.

In explaining the invention more fully I will refer to its application to the manufacture of the parts or pieces called "staffs," which are used in the manufacture of clocks, and consist of small steel shafts having pintles or pivots formed at their ends and carrying one or more brass disks forming "centers," to which the thin brass gears are secured or blanks for holding the wires of lantern-pinions. Heretofore in producing a piece of this character it has been customary to first cut the shafts from a rod of stock in a cutting-off machine, leaving them a little longer than the finished piece, then to point the ends so that the shaft may be supported in the female centers of a lathe, then to force on the brass blanks in a special machine, then to turn the blanks and the ends of the shaft to form the pivots or pintles, making notches at the points where the ends should be broken off to give the piece the proper length, then to polish or burnish the pintles with a hand burnishing-tool, and then to break off the ends of the pintles to give the piece the proper length. This method of making the pieces is slow and expensive, requiring successive handlings of the piece and also requiring skill on the part of the operator in turning and finishing the blanks and pintles. In the machine embodying the present invention mechanisms for holding and revolving the shaft, for forcing the blank or blanks onto the shaft and for turning the blanks or shaft are combined to automatically assemble the shaft and blank or blanks and to turn the blanks or shaft to the size and shape required, and in case the shaft is to be turned to form pintles the machine may be, and preferably is, provided with mechanism coöperating with the other mechanisms to automatically perform this operation, and in case the pintles are to be polished or burnished the machine may be, and preferably is, also provided with mechanism coöperating with the other mechanisms to automatically perform this operation. The mechanism for holding and revolving the shafts preferably consists of a spindle provided with a chuck for holding the rod of stock from which the shafts are cut, and it is preferred to form successive shafts by feeding a rod of stock through the chuck the required distance to make a shaft after the preceding shaft has been severed from the end of the rod of stock. The blanks are preferably carried in blank-carriers, and in case more than one blank is to be forced onto the shaft or rod of stock it is also preferred to employ a series of carriers, which are successively brought into position in line with the shaft and advanced to force the blanks carried thereby onto the rod of stock. The cutters for turning the blank or blanks and for turning the pintles on the shaft or rod are then successively brought into position to act upon the blanks and rod, during which time it is preferred to support the outer end of the rod or shaft. The mechanism for polishing or burnishing the pintles is then brought into operation, after which the shaft is severed from the end of the rod of stock, and said rod is again fed forward through the chuck the required distance to make another shaft, and the operations are repeated.

In the accompanying drawings I have shown a machine embodying all the features of my invention and adapted to automatically perform any or all the operations above referred to, and in describing the construction of this machine I will refer to its mode of operation in automatically assembling and finishing a staff having burnished pintles and provided with three blanks, one of which is a center for a thin gear and the other two the sides of a lantern-pinion.

The machine which I have shown, in addition to the features of invention already outlined, embodies other features of inventions relating to the combinations of elements entering into the different mechanisms which I have preferred to use in effecting the operations involved in employing the main features of the invention. These features and combinations will be more particularly referred to in the claims.

Figure 2:
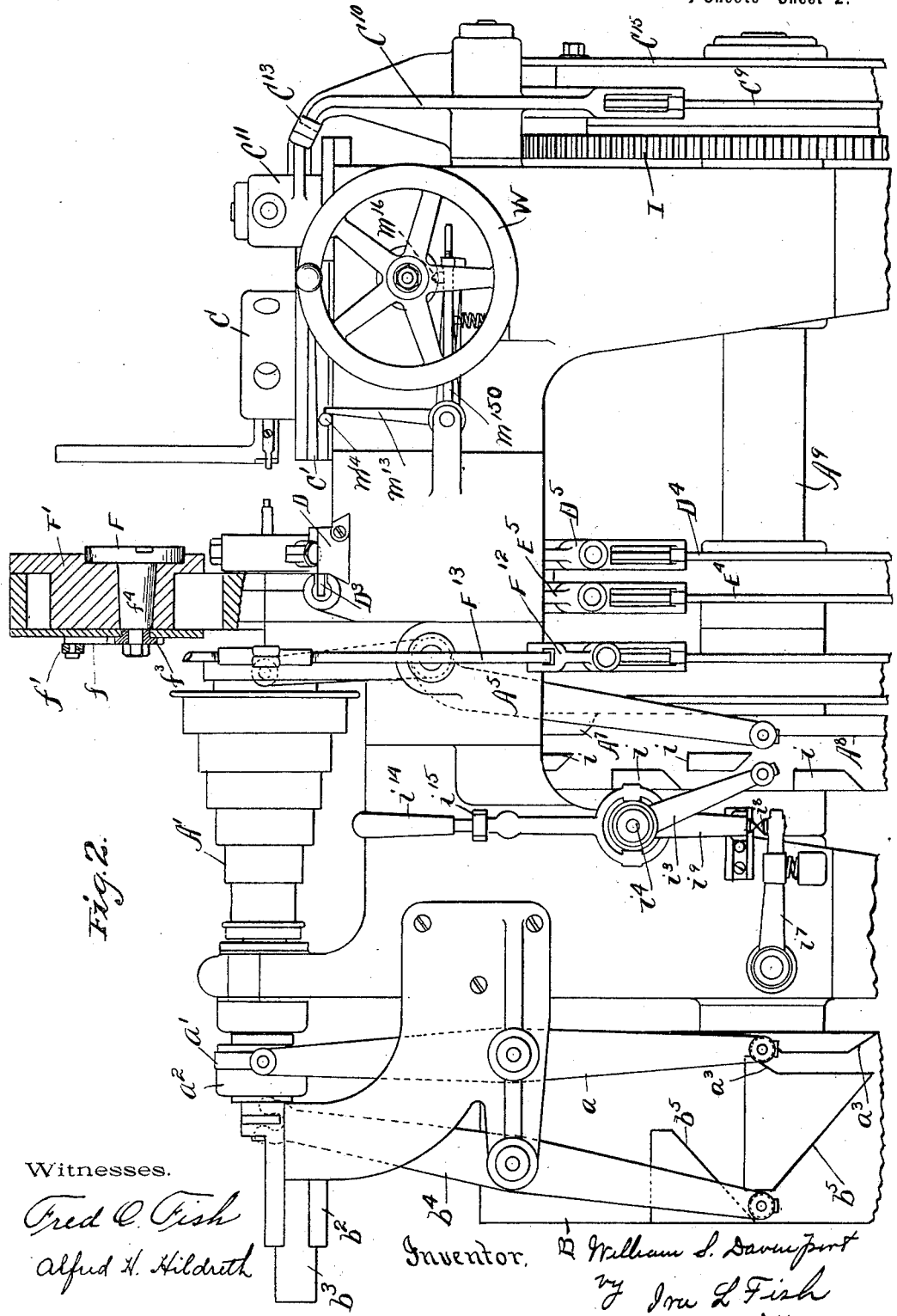
Figure 3:
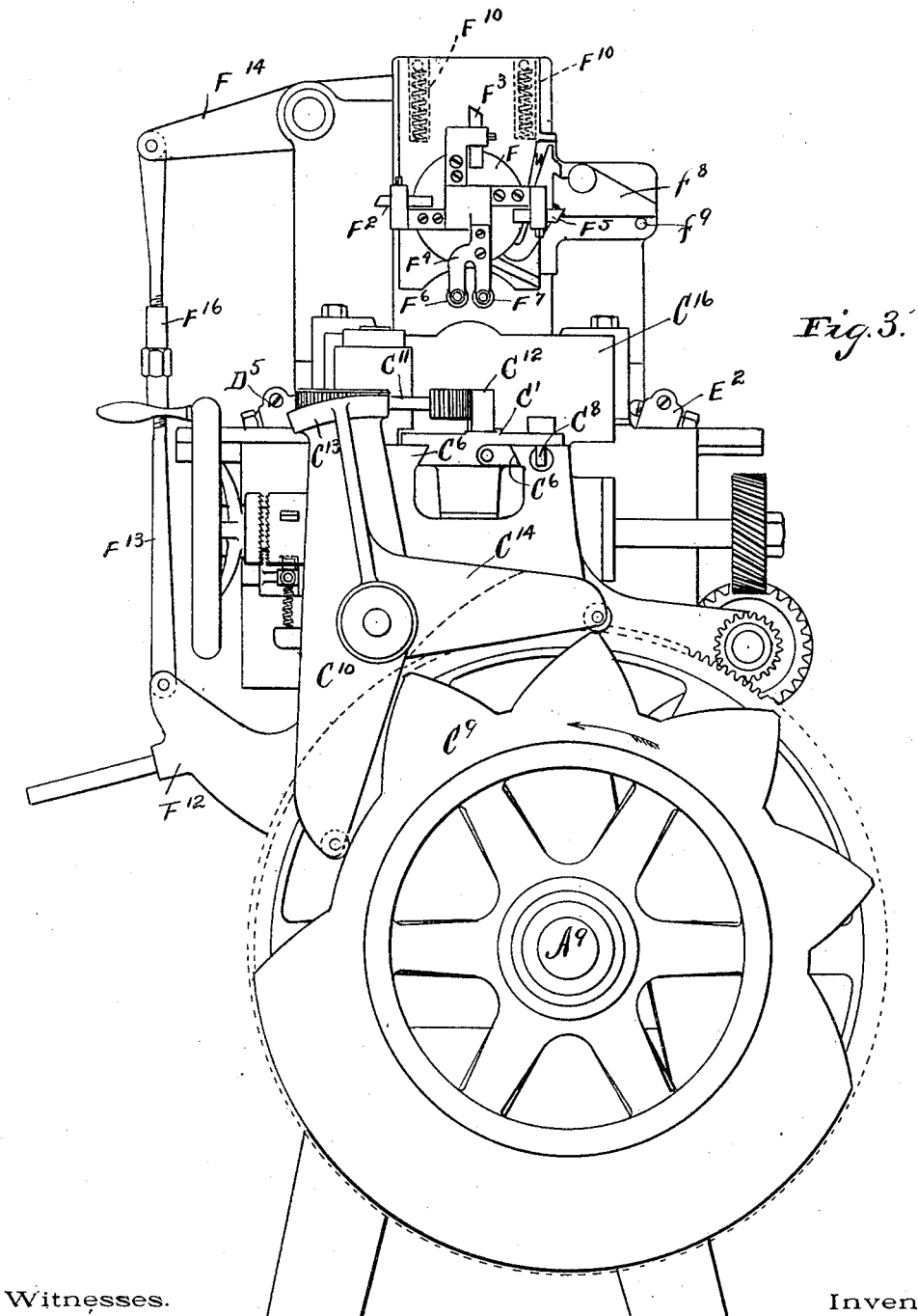

In the drawings, Figure 1 is a plan view of the machine. Fig. 2 is a front elevation. Fig. 3 is an end view. Fig. 4 is a transverse sectional view showing the mechanism for operating the cross-slides. Fig. 5 is a transverse sectional view showing the mechanism for operating turret-slide $F'$. Fig. 6 is a detail view showing the spindle-operating clutch. Figs. 7 and 8 are detail views showing the blank-carrying magazine. Fig. 9 is a view showing the article formed by the machine. Fig. 10 is a sectional view showing the mechanism for indexing the turret C. Figs. 11 and 12 are details of said mechanism, and Fig. 13 is a detail of the mechanism for controlling the speed-changing clutch.

The rod of stock $t$, from which the shafts $s$ are severed, is held and rotated by a chuck carried by a spindle A, the jaws of said chuck being opened to allow the feed of the stock and being closed to hold the stock by the action of a lever $a$, the upper end of which is connected with a ring $a'$, carried by a sleeve $a^2$, and the lower end of which is arranged in the path of cams $a^3$, carried by a drum B, secured to a cam-shaft $A^9$. The rod of stock is fed at the proper time by means of a feeding-tube $b$, which is connected by an arm $b'$ with slide $b^2$, mounted on a guideway $b^3$, the slide being reciprocated to advance and retract the feeding-tube by a lever $b^4$, the upper end of which is connected with the slide and the lower end of which is arranged in the path of cams $b^5$, secured to the drum B, so that as the drum rotates the lever is oscillated about its pivot. The feeding-tube, the chuck, and the devices for operating the jaws of the chuck from the sleeve $a^2$ may be of any well-known construction—such, for instance, as shown in the Patent No. 514,441, dated February 13, 1894, or in Patent No. 604,306, dated May 17, 1898—and the specific construction of these devices is not shown and need not be described, being well understood.

The spindle A is rotated by means of a cone-pulley $A'$, loosely mounted on the spindle and connected therewith through a clutch $A^2$, keyed to slide on a sleeve $A^3$, secured to the spindle, the clutch being forced into engagement with the end of the pulley by a spring $A^4$ and being disengaged from the pulley when the rotation of the spindle is to be arrested by a lever $A^5$, the upper end of which is connected with a ring $A^6$, carried by the clutch, and the lower end of which is acted upon by a cam $A^7$, mounted on a drum $A^8$, which is secured to a cam-shaft $A^9$. The parts are so timed that after a shaft has been severed from the end of the rod of stock by mechanism to be described the jaws of the chuck are opened and the rod fed forward the proper distance, after which the jaws are closed to clamp the rod. The disks $w\ w'\ w^2$ are then forced onto the rod or shaft $s$ at the end of the rod, clutch $A^2$ being disengaged from the pulley $A'$ during this operation, so that the rod is not revolved while the disks or blanks are being forced on.

The blanks are forced onto the rod of stock or shaft by carriers in the form of magazines $c\ c'\ c^2$, which are supported on a drum or turret C, mounted to rotate upon a slide $C'$, which is reciprocated to force the blanks onto the rod, the turret being given a partial rotation or indexed after each advance movement of the slide to bring the carriers successively into position in line with the rod or shaft. The magazines consist of chutes or guide-tubes in which the blanks are arranged one above another, the lower blank resting upon a support $c^3$ at the bottom of the tube and being retained in position by spring-fingers $c^4$, as shown in Figs. 7 and 8. When a guide-tube is brought into position in front of the rod $t$, the hole in the lower blank registers with the rod, so that when the turret-slide advances the rod passes through said hole and the blank is forced onto the rod a distance depending upon the forward movement of the slide. When the slide is retracted, the fingers $c^4$ yield and allow the lower blank to pass out of the tube, the blank above dropping down upon the support $c^3$, ready to be forced onto the rod when the tube is again brought into position and the slide advanced. After the blanks have been forced onto the shaft at the end of the rod $t$ the clutch $A^2$ is engaged with the pulley A' and the rod is revolved while the blanks are turned to the required size and shape and while the pintles $p\ p'$ are turned and burnished and the shaft severed from the rod, the end of the shaft or rod being supported during the action of the turning and burnishing tools by supports or bearings carried by the turret C and brought into engagement with the end of the rod or shaft by indexing said turret and advancing the turret-slide. The tools for acting upon the blanks and shaft or rod are carried upon the turret C, cross-slides D and E, and upon a turret F, mounted upon a slide F', located above the spindle A. The tools may be arranged upon these carrying devices in any suitable manner and the mechanisms for operating the carriers timed to bring the proper tools into action at the proper times, the arrangement and timing which I will describe being suitable for the production of the character of piece shown in Fig. 9. After the blanks $w\ w'\ w^2$ have been forced onto the rod or shaft and the spindle is connected with the driving-pulley the turret C is indexed to bring the cutter $C^2$ into position in front of the rod or shaft and the turret-slide is advanced, the cutter acting during the advance of the turret-slide to turn the outer edge of the blank $w^2$ and form the shoulder $w^3$ thereon. During the action of the cutter the outer end of the shaft or rod is supported in a bearing $C^3$, which is carried by the turret and forced forward by a spring $C^4$. After the cutter $C^2$ has acted the turret-slide is retracted and the turret indexed to bring the bearing $C^5$, carried thereby, into position in front of the rod or shaft, and then the turret-slide is advanced to bring the bearing into engagement with the outer end of the shaft and is held in this position during the subsequent operations upon the blanks and shaft, so that the outer end of the shaft is supported during these operations. The sides of the blanks and the outer edges of the blanks $w\ w'$ are then turned by cutters $F^2\ F^3$, carried in the turret F, after which the pintle $p'$ is turned by the cutter D' on the slide D and the pintle $p$ for the end of the next shaft is turned by the cutter E' on the slide E. The pintles $p\ p'$ are then burnished by a burnishing-tool $F^4$, carried by the turret F, after which the shaft is severed from the rod $t$ by a cutter $F^5$, carried by the turret F.

The mechanism employed for burnishing the part of the rod or shaft forming the pintles consists of two rolls $F^6\ F^7$, arranged to pass on opposite sides of the rod or shaft and subject the surface of the rod to pressure as they pass laterally over the shaft, so that said shaft is subjected to a rolling pressure applied to opposite sides thereof, which polishes or burnishes the shaft at this part. With this construction and arrangement of burnishing mechanism the shaft or rod may be efficiently burnished or polished at any desired part and without subjecting the rod to an unbalanced pressure.

The turret-slide C' is guided in ways $C^6$ and is forced rearward by a spring $C^7$, arranged in a recess in the frame and engaging a pin $C^8$ on the slide. The slide is advanced at the proper times and its backward movement under the action of the spring is controlled by a cam $C^9$, secured to the cam-shaft $A^9$, which engages the lower end of a lever $C^{10}$, the upper end of which is connected with the slide $C^8$ by a gear-segment $C^{11}$, one part of which engages a rack $C^{12}$ on the slide and the other part of which engages a segment $C^{13}$, formed on the upper end of the lever $C^{10}$. The lever $C^{10}$ is provided with an arm $C^{14}$, arranged in a different plane, and a cam $C^{15}$, similar to cam $C^9$, may be secured to the shaft $A^9$ and act as a safety device for returning the slide C' in case the spring $C^7$ fails to act properly. The cam-shaft $A^9$ is driven slowly during the advancing or feeding movement of the turret-slide, and when the turret-slide is to be retracted the shaft is speeded up or driven at a high speed to allow a quick return of the turret-slide. The cam-shaft is thus driven by the action of two driving mechanisms, one of which runs continuously at a slow speed and the other of which runs continuously at a fast speed, one or the other of said mechanisms being connected with said cam-shaft, according to the speed at which the shaft is to be driven. The speed of the fast-driving mechanism is constant, while the slow-driving mechanism is provided with means for varying the speed. The form of driving mechanism which I prefer to employ is that embodied in the machine shown in the drawings. In this machine the cam-shaft $A^9$ carries a gear I, which is engaged by a pinion I', secured to a shaft $I^2$, on which is keyed a clutch $I^3$, arranged to connect said shaft either with a pulley $I^4$, loosely mounted on said shaft, or with a shaft $I^5$, driven through a cone-pulley $I^6$. The pulley $I^4$ is driven at a comparatively high speed and the shaft $I^5$ is driven at a comparatively slow speed in the same direction, the clutch being shifted to connect either the pulley or the shaft $I^5$ with the cam-shaft $A^9$, and the speed of the shaft $I^5$ being varied, if desired, by shifting the belt on the cone-pulley $I^6$. The clutch $I^3$ is automatically shifted at the proper times by action of cams $i$, carried by the drum $A^8$, secured to the cam-shaft $A^9$, the cams being arranged to act upon the end of an arm $i^3$, connected with the front end of a shaft $i^4$, the rear end of which carries an arm $i^5$, which is connected with the clutch $I^3$ by a rod $i^6$. When the arm $i^3$ is moved in either direction by the cams $i$, it is held in position until shifted in the opposite direction by a spring-pressed arm $i^7$, having a V-shaped lug $i^8$, which engages the V-shaped end of an arm $i^9$, projecting from the arm $i^3$. To enable the operation of the machine to be stopped by shifting the clutch $I^3$ into mid-position where it is disconnected from both the pulley $I^4$ and the shaft $I^5$, and to also enable the operative parts of the machine when thus disconnected from the driving mechanism to be operated manually without affecting the clutch $I^3$, the arm $i^3$ is connected with the shaft $i^4$ through a detachable connection which may be operated to disconnect the arm $i^3$ from the shaft $i^4$. When the shaft and arm are disconnected, the arm may be oscillated by the cams $i$ as the cam-shaft $A^9$ is operated manually while the clutch $I^3$ is held in mid-position. The detachable connection between the arm $i^3$ and the shaft $i^4$ and the device for holding the clutch in mid-position are preferably connected together so that they may be operated simultaneously, and the preferred form of these devices is that embodied in the machine shown and is illustrated in Figs. 2 and 13. The arm $i^3$ is loosely mounted on the end of shaft $i^4$, and the arm $i^9$ is provided with a recess formed in a lug $i^{10}$ and arranged for engagement with a projection $i^{11}$ on the lower end of an arm or lever $i^{12}$, which is secured to a collar $i^{13}$, fast on shaft $i^4$. The lever is pivoted to the collar $i^{13}$, and may be turned on its pivot to connect or disconnect it with the arm $i^3$ by a handle $i^{14}$, formed at the upper end of the lever. When engaged with the arm $i^3$, the lever may be held in this position by a catch $i^{15}$, pivoted to the lever and arranged to engage the end of an arm $i^{16}$, rising from the collar $i^{13}$. The lower end of the lever $i^{12}$ is provided with a second projection $i^{17}$, which may be engaged with a recess formed in a lug $i^{18}$ on the frame of the machine when the lever is disconnected from the arm $i^3$, the recess being so located that the clutch $i^3$ will be in its mid-position when the lever is engaged with said recess.

The turret C is given a partial revolution or indexed at the proper times by mechanism which starts the turret from a state of rest with a gradually-increasing rate of speed and brings said turret to a state of rest with a gradually-retarded speed, so that said turret may be indexed rapidly without jar or shock, and the turret is held in the position into which it is turned by the indexing mechanism by a locking-pin, which is withdrawn just before the indexing begins and is engaged with a socket in the turret after the indexing is completed. The mechanism which I have devised for thus indexing and locking the turret is best shown in Figs. 10, 11, and 12. The turret is provided with a depending stud or post M, mounted in a bearing in the slide $C'$ and having a collar or hub $m$ secured to its lower end. The hub $m$ carries a series of radial projections or teeth in the form of balls $m'$, mounted on radial studs secured in the hub $m$, the number of teeth or projections corresponding to the number of partial rotations given to the turret in each complete revolution of the turret, which in the machine shown is five. When the turret-slide is in its retracted or indexing position, one of the balls $m'$ is in position to be acted upon by a cam $m^2$, formed on an intermittently-revolving drum $m^3$, mounted on a shaft $m^4$. The cam is in the form of a spirally-arranged rib, which passes between two of the projections $m'$, and when the drum $m^3$ revolves the cam $m^2$ acts upon a ball $m'$, turning the turret and bringing the following ball $m'$ into position to be acted upon by a cam $m^2$. The cam $m^2$ is so shaped that it will start the turret with a gradually-increasing speed and will stop the turret with a gradually-retarded speed. I prefer to provide three cams $m^2$ on the drum $m^3$ and to give the shaft $m^4$ a third of a revolution for each indexing of the turret, although it will be understood that I may use a single cam $m^2$, in which case the shaft $m^4$ will be given a full revolution for each indexing of the turret, or I may otherwise vary the number of cams employed, also varying the rotation of the shaft $m^4$ to suit the number of cams employed. In order that the turret may be turned by hand, if desired, when in the indexing position, the front end of a cam $m^2$ is located a sufficient distance in advance of the rear end of a cam $m^2$ to allow the teeth or projections on the turret to pass between the ends of the cams as the turret is revolved by hand. The shaft $m^4$, on which the drum $m^3$ is mounted, is driven continuously from the shaft through spiral gears $m^5$, and the drum $m^3$ is connected with said shaft $m^4$ when the indexing is to take place and is disconnected from said shaft when the drum has made a third of a revolution. The drum $m^3$ is secured to a sleeve $m^6$, loosely mounted on the shaft $m^4$ and carrying at its outer end a clutch-sleeve $m^7$, which is keyed to slide on the sleeve $m^6$ and is forced toward a clutch-sleeve $m^8$, secured to the shaft $m^4$ by a spring $m^9$. The sleeve $m^7$ is held out of engagement with the sleeve $m^8$ against the stress of spring $m^9$ by a pin $m^{10}$, arranged to engage a cam $m^{11}$, formed at one side of a cam-groove $m^{12}$ in the sleeve $m^7$. There are three cam-grooves $m^{12}$ in the sleeve $m^7$, and when the pin $m^{10}$ is withdrawn from engagement with a cam $m^{11}$ the clutch-sleeve $m^7$ is engaged with sleeve $m^8$ and the drum $m^4$ is revolved until the pin $m^{10}$ enters the next cam-groove $m^{12}$, when the cam $m^{11}$ acts against said pin to force the sleeve $m^7$ back, the end of the cam-groove engaging the pin and stopping the rotation of the sleeve and the drum $m^3$. The pin $m^{10}$ is carried on the end of one arm of a lever $m^{13}$, the other arm of which is arranged in the path of a pin $m^{14}$ on the turret-slide C, and said pin is held in engagement with the sleeve $m^7$ by a spring $m^{15}$ acting on the lever $m^{13}$. When the turret-slide is retracted, the pin $m^{14}$ acts on the lever $m^{13}$ and withdraws the pin $m^{10}$ from engagement with the cam $m^{11}$, so that the drum $m^3$ is connected with the shaft $m^4$ and rotates therewith to index or rotate the turret. During the indexing the slide C is moved forward a sufficient distance to disengage the pin $m^{14}$ and lever $m^{13}$, so that the pin $m^{10}$ enters the next groove $m^{12}$ and coöperates with the cam $m^{11}$ of that groove to disconnect the drum $m^3$ from the shaft $m^4$ and arrest the rotation of said drum. The drum is held in position until the next indexing movement by a spring-pressed lever $m^{150}$, having a V-shaped lug which engages a V-shaped notch $m^{16}$ in the sleeve $m^7$.

The turret C is locked in position on the slide C' between the indexing movements of the turret by a spring-pressed locking-pin $m^{18}$, arranged to engage one of a series of recesses or sockets $m^{19}$, formed in the turret. The pin is retracted against the stress of its spring to unlock the turret just previous to the indexing of the turret by a lever $m^{20}$, the vertical arm of which is brought into engagement with a pin $m^{21}$, projecting from the frame, by the backward movement of the turret-slide. The turret may be partially surrounded by a shield $C^{16}$, if desired, as shown in Figs. 1 and 3.

The cross-slide D is mounted in ways extending transversely of the frame of the machine and is forced outward or away from the work by a spring $D^2$, which is mounted in a recess in the frame and engages a pin $D^3$ on the slide. The slide is advanced or moved inward by a cam $D^4$, secured to the shaft $A^9$ and arranged to engage the lower end of a lever $D^5$, the upper end of which engages the cross-slide. The cross-slide E is mounted in a similar manner and is advanced by a cam $E^4$, secured to the shaft $A^9$ and arranged to engage the end of a lever $E^5$, provided with a segment at its upper end, which engages a segment $E^3$, formed on a lever $E^2$, the upper end of which engages the slide E. The slides D and E may be operated manually by handles $D^6$ $E^6$, inserted in sockets in the levers $D^5$ $E^5$.

The turret F is mounted on a slide F', which is guided in a guideway formed in the support $F^8$, rising from the front bearing of the spindle A, the turret being so arranged that its axis is parallel to the axis of the spindle and the slide being so arranged that the turret is moved toward and from the work in a direction at right angles to the axis of the spindle. The slide F' is held in the support $F^8$ by a plate $F^9$, secured to the back of the slide and overlying the rear side of the support, and is retracted or forced upward by springs $F^{10}$, mounted in recesses in the support $F^8$ and engaging pins carried by the slide F' and the plate $F^9$. The slide is advanced or given its movement to cause the tools carried by the turret to act upon the work by a cam $F^{11}$, secured to the shaft $A^9$ and arranged to act upon a lever $F^{12}$, which is connected by means of a rod $F^{13}$ with the outer end of a lever $F^{14}$, the other end of which is connected with the slide F' by a link $F^{15}$. The lever $F^{12}$ may be provided with an arm $F^{16}$, arranged to be acted upon by a cam similar to the cam $F^{11}$ and timed to retract the slide F' in case the springs $F^{10}$ fail to properly perform their function. In order that the position to which the turret is advanced by the cam may be varied, it is preferred to make the connections between the cam and turret-slide adjustable, which is done in the machine shown by forming the rod $F^{13}$ in two parts, having oppositely-arranged screw-threads on their ends and connecting said ends by a screw-coupling $F^{17}$.

The turret F is given a partial revolution or indexed as it is retracted by means of a pawl $f$, pivoted to a bracket $f'$ on the support $F^8$ and provided with teeth for engaging the teeth of a ratchet-wheel $f^3$, secured to the rear end of the post or stud $f^4$, by which the turret is supported in the slide F'. The turret is locked between the indexing movements by a spring-pressed locking-lever $f^5$, the front end of which is arranged to engage one of a series of recesses $f^6$, formed in the turret F. The lever $f^5$ is pivoted to the slide F', and its rear end is provided with a lug or projection $f^7$, arranged to coöperate with a cam-plate $f^8$, pivoted to the frame. When the slide F' is in its retracted position, the parts are in the positions shown in Fig. 5. When the slide is advanced, the pawl $f$ is swung back as the ratchet-wheel moves forward, and the plate $f^8$ swings on its pivot to allow the lever $f^5$ to pass by its inner end. After the ratchet-wheel has advanced beyond the pawl the pawl swings into position to engage the ratchet-wheel on the return movement of the slide, and after the lever has passed beyond the end of the plate $f^8$ said plate swings into the position shown, where it is supported by a pin $f^9$. When the slide F' is retracted, the lug $f^7$ strikes the end of plate $f^8$ and is swung about its pivot, thus unlocking the turret, and as the lug is passing along the end of plate $f^8$ the ratchet-wheel is engaged by the pawl and given a partial revolution, bringing the succeeding recess $f^6$ under the end of lever $f^5$, so that when the lug passes off the end of plate $f^8$ the lever is engaged with said recess and locks the turret, ready for the next forward movement.

The machine may be operated manually when the power is disconnected or when the clutch $I^3$ is in mid-position by means of a hand-wheel W, secured to the front end of shaft $m^4$.

What I claim, and desire to secure by Letters Patent, is—

1. The combination of mechanism for holding and rotating a shaft, mechanism for forcing a blank onto said shaft, and mechanism for turning the blank operatively connected and combined to automatically assemble the shaft and blank and to turn the blank.

2. The combination of mechanism for holding and rotating a shaft, mechanism for forcing a blank onto said shaft, and mechanism for turning the shaft operatively connected and combined to automatically assemble the shaft and blank and to turn the shaft.

3. The combination of mechanism for holding and rotating a shaft, mechanism for forcing a blank onto said shaft, mechanism for turning said blank, and mechanism for turning said shaft operatively connected and combined to automatically assemble the shaft and blank and to turn the blank and shaft.

4. The combination for holding and rotating a rod of stock, mechanism for forcing a blank onto said rod of stock, mechanism for turning said blank, and mechanism for severing said rod of stock.

5. The combination of mechanism for holding and rotating a rod of stock, mechanism for forcing a blank onto said rod, mechanism for turning said blank, and mechanism for turning and severing said rod of stock.

6. The combination of mechanism for holding and rotating a rod of stock, mechanism for forcing a blank onto said rod, mechanism for supporting the outer end of said rod, mechanism for turning said blank, and mechanism for turning and severing said rod.

7. The combination of mechanism for holding and rotating a rod of stock, mechanism for forcing a blank onto said rod, mechanism for turning said blank, mechanism for turning a part of said rod, mechanism for burnishing the turned part of said rod, and mechanism for severing said rod.

8. The combination of mechanism for holding and rotating a rod of stock, mechanism for forcing a blank onto said rod, mechanism for turning said blank, mechanism for supporting the outer end of the rod, mechanism for turning a part of said rod, and mechanism for severing the rod at the turned part.

9. The combination of mechanism for holding a rod or shaft, of a reciprocating blank-carrier for forcing a blank onto said rod or shaft operatively connected and combined to automatically assemble the blank and shaft.

10. The combination of a mechanism for holding and rotating a rod of stock, mechanism for intermittently feeding said rod, mechanism for forcing a blank onto said rod, and mechanism for severing said rod.

11. The combination of a chuck for holding and rotating a rod of stock, mechanism for intermittently feeding said rod through said chuck, a blank-carrier for forcing a blank onto said rod of stock, and cutters for turning said blank and for severing said rod of stock.

12. The combination of a chuck for holding and rotating a rod of stock, mechanism for intermittently feeding said rod through said chuck, a blank-carrier for forcing a blank onto said rod of stock, and cutters for turning said blank and rod and severing said rod.

13. The combination of a chuck for holding and rotating a rod of stock, mechanism for intermittently feeding said rod through said chuck, a blank-carrier for forcing a blank onto said rod, cutters for turning said blank and rod and severing said rod, and mechanism for burnishing the turned parts of said rod.

14. The combination of mechanism for holding a rod or shaft, a series of blank-holders, mechanism for bringing said holders successively into line with said rod, and mechanism for causing a relative movement between said rod and holders longitudinal of said rod to force blanks onto said rod.

15. The combination of mechanism for holding and rotating a shaft or rod, a series of blank-holders, mechanism for bringing said holders successively into line with said rod, mechanism for causing a relative movement between said rod and holders longitudinal of said rod to force blanks onto said rod, and mechanism for turning said blanks.

16. The combination of mechanism for holding and rotating a rod of stock, mechanism for intermittently feeding said rod forward, a series of blank-holders, mechanism for bringing said holders successively into line with said rod, mechanism for causing a relative movement between raid rod and holders longitudinal of said rod to force blanks onto said rod, and mechanism for severing said rod.

17. The combination with a turret-slide of a cam for controlling the forward and return movement of said slide, a driving mechanism for driving said cam at a high speed during the return of said slide, a separate driving mechanism for driving said cam in the same direction at a slow speed during the advance of said slide, mechanism for alternately connecting said driving mechanism with said cam and means for varying the speed of the slow-driving mechanism.

18. The combination with a turret-slide, of a cam for controlling the forward and return movements of said slide, a pulley driven at a high speed, a shaft driven in the same direction at a slow speed, a cone-pulley for driving said shaft, and a clutch for alternately connecting the pulley and shaft with said cam.

19. The combination with a cam-shaft, of two driving mechanisms, a clutch for connecting either of said driving mechanisms with said cam-shaft, a rock-shaft connected with said clutch, an arm operated by a cam on said cam-shaft, and a detachable connection between said arm and said rock-shaft.

20. The combination with a cam-shaft of two driving mechanisms, a clutch for connecting either of said driving mechanisms with said cam-shaft, a rock-shaft connected with said clutch, an arm operated by a cam on said cam-shaft, a lever secured to said rock-shaft, and arranged to either be engaged with said arm and connect it with said rock-shaft or to be engaged with a fixed part and hold the clutch out of engagement with both driving mechanisms.

21. The combination with a turret, of means of indexing the same comprising radially-arranged projections or teeth, a cam-drum, a series of cam-ribs on said drum for successively engaging said projections, and means for intermittently giving the cam-drum a partial revolution.

22. The combination with a turret of means for indexing the same comprising radially-arranged projections or teeth, an intermittently-revolving cam-drum, a spirally-arranged cam thereon for engaging said projections, and a space between the ends of said cam to allow the rotation of said projections when said cam-drum is stationary.

23. The combination with a rock-shaft $i^4$ of an oscillating arm $i^9$ loosely mounted thereon, a collar $i^{13}$ secured to said shaft, a lever $i^{12}$ pivoted to said collar, an engaging recess and projection for connecting the lever $i^{12}$ with the arm $i^9$, and an engaging recess and projection for connecting the lever and a fixed part.

24. The combination with a turret of means for indexing the same comprising radially-arranged teeth or projections connected with the turret, and an intermittently-revolving cam for engaging said projections and shaped to start the turret with a gradually-increasing speed and stop said turret with a retarded speed.

25. The combination with a turret, of means for indexing the same comprising radially-arranged teeth or projections connected with said turret, and a spirally-arranged cam for engaging said projections and shaped to start the turret with a gradually-increasing speed and stop said turret with a retarded speed.

26. The combination with a turret of means for indexing the same comprising radially-arranged teeth or projections connected with said turret, and a cam-drum having spirally-arranged ribs for passing between said projections and rotating said turret, said ribs being shaped to start said turret with a gradually-increasing speed and stop said turret with a retarded speed.

27. The combination with a reciprocating turret of means for indexing the same comprising radially-arranged teeth or projections connected with the turret, and a spirally-arranged cam mounted in fixed position for engaging said projections when the turret is retracted.

28. The combination with a turret, of means for indexing the same comprising radially-arranged projections $m'$, a cam-drum $m^3$ having spirally-arranged ribs $m^2$ shaped to start said turret with a gradually-increasing speed and stop said turret with a retarded speed and means for intermittently revolving said drum.

29. The combination with a turret, of means for indexing the same comprising radially-arranged teeth or projections, an intermittently-revolving cam for engaging said projections having a space between its ends to allow the rotation of said projections when said cam is stationary.

30. The combination with a work-carrying spindle, of a turret-slide arranged to slide in a direction at right angles to the axis of such spindle, and a turret mounted in said slide with its axis parallel to the axis of said spindle.

31. The combination with a work-carrying spindle, of a vertically-moving turret-slide arranged above said spindle, and a turret carried by said slide and having the axis parallel to the axis of the spindle.

32. The combination with a work-carrying spindle, of a turret-slide arranged to move in the direction of the spindle-axis, a turret mounted thereon, cutter-slides mounted to move transversely of the spindle-axis, a vertically-movable turret-slide mounted above the spindle, and mechanisms for operating said slides and turrets.

33. The combination of assembling mechanism and turning mechanism operatively connected and combined to automatically assemble a blank and shaft and to turn the same.

34. The combination with a work-carrying spindle, of a vertically-movable turret-slide mounted above said spindle, a cam-shaft below said spindle, a lever connected with said slide, a second lever connected with said first lever and operated by a cam on said cam-shaft.

35. The combination with a work-carrying spindle, of a vertically-movable turret-slide mounted above said spindle, a cam for operating said slide mounted below said spindle, connections between said cam and slide comprising a lever engaged by said cam, a lever connected with said slide, and connections between said levers, and means for adjusting the connections between said cam and said slide.

In testimony whereof I have affixed my signature in presence of two witnesses.

WILLIAM S. DAVENPORT.

Witnesses:
ELIZABETH C. WELSH,
LILY F. DARCY.